United States Patent

Klank et al.

Patent Number: 5,274,669
Date of Patent: Dec. 28, 1993

[54] SIGNAL EQUALIZING METHOD EMPLOYING TEST SEQUENCES

[75] Inventors: Otto Klank, Lehrte-Arpke; Jürgen Laabs, Pattensen, both of Fed. Rep. of Germany

[73] Assignee: Deutsche Thomson-Brandt GmbH, Villingen-Schwenningen, Fed. Rep. of Germany

[21] Appl. No.: 820,696

[22] PCT Filed: Jun. 1, 1990

[86] PCT No.: PCT/EP90/00873
§ 371 Date: Jan. 27, 1992
§ 102(e) Date: Jan. 27, 1992

[87] PCT Pub. No.: WO90/15495
PCT Pub. Date: Dec. 13, 1990

[30] Foreign Application Priority Data

Jun. 6, 1989 [DE] Fed. Rep. of Germany ....... 3918340

[51] Int. Cl.$^5$ .............................................. H03H 7/30
[52] U.S. Cl. ........................................ 375/11; 375/96; 375/54; 364/724.2
[58] Field of Search ............... 375/11, 12, 13, 14, 375/99, 100, 96, 54; 333/18, 28 R; 364/724.2, 724.19

[56] References Cited

U.S. PATENT DOCUMENTS

| | | | |
|---|---|---|---|
| 4,112,370 | 9/1978 | Monsen | 375/100 |
| 4,392,232 | 7/1983 | Andren et al. | 375/96 |
| 4,441,192 | 4/1984 | Kita et al. | 375/14 |
| 4,599,732 | 7/1986 | LeFever | 375/13 |
| 4,606,045 | 8/1986 | Miller | 375/13 |
| 4,621,366 | 11/1986 | Cain et al. | 375/11 |
| 4,731,801 | 3/1988 | Hendrikson | 375/100 |

FOREIGN PATENT DOCUMENTS

| | | |
|---|---|---|
| 3246525 | 6/1984 | Fed. Rep. of Germany . |
| 3540716 | 5/1987 | Fed. Rep. of Germany . |

Primary Examiner—Stephen Chin
Attorney, Agent, or Firm—Spencer, Frank & Schneider

[57] ABSTRACT

In order to equalize digitally coded signals, predetermined test sequences are transmitted before useful data is transmitted. The test sequences are correlated with an identical test sequence stored in the receiver and the result of the correlation, in the form of a channel pulse response correlation spectrum, is used to control filter coefficients of a receiver filter arrangement to simulate an inverse transfer function of the transmission channel.

5 Claims, 4 Drawing Sheets

TRANSMISSION PATH/MULTI-PATH RECEPTION

RECEIVER STRUCTURE

M-SEQUENCE: $u_i$  i=0...30

SUPERPOSITION:
$x_i = U_i + .5 \cdot U_{i-7} + .25 \cdot U_{i-15} + .75 \cdot U_{i-28}$ CYCLICAL CORRELATION $Q_{u,x}$ $S_{max}$

SIGNAL EQUALIZING METHOD EMPLOYING TEST SEQUENCES

BACKGROUND OF THE INVENTION

1. Field of the Invention

The invention relates to a signal equalizing method in a receiver for digitally coded signals received over a transmission channel with multi-path reception.

2. Background Information

In wireless signal transmission in the higher frequency domain, the signal sometimes reaches the receiver in different ways, i.e., from different directions. In addition to a direct path, reflections from buildings or natural elevations may conduct the signal broadcast by the transmitter to the receiver on other than the direct path. Since the individual paths differ in length and attenuation, the receiver receives several signals which all contain the original information but may differ from one another in amplitude, delay and phase angle. The superposition of these signals results in a compound signal in which the original information is more or less distorted. This may result in considerable interference, particularly in digital signals.

SUMMARY OF THE INVENTION

It is the object of the invention to provide a signal equalization method which eliminates the interferences caused by multi-path reception to the extent that the original signal is readable again.

This is accomplished in a method in which predetermined test sequences are transmitted, received and correlated to obtain a channel pulse response which is thereafter used to continue a filter arrangement for correcting for multi-path distortions.

In an embodiment of the method according to the invention, the transfer characteristics of the transmission channel are determined in order to obtain the composition of individual transmission paths at the location of the receiver The determination of these characteristics may be repeated at short time intervals so that changes occurring in the meantime, as they are encountered in particular with moving receivers, can be considered and adjusted to.

For this purpose, test sequences of an agreed-upon structure are broadcast and, due to the multi-path reception, they are of course subjected to the same distortions as useful data. However, in contrast to the useful data, the structure of the test sequences is known from the start so that conclusions regarding the distortions that took place in the transmission channel can be drawn. In detail, a correlation is performed between the test sequence which is also stored in the receiver and the received test sequence which is distorted due to superposition of multi-path signals.

The result, the channel pulse response, constitutes a correlation spectrum in which the individual spectral components represent the paths on which the original signal traveled from the transmitter to the receiver. This spectrum can be employed to control a filter arrangement which substantially simulates the inverse of the transfer function of the transmission channel. Once the superposed signal has passed through this filter arrangement, the distortions that occurred on the transmission path are cancelled out. This filter arrangement may be adjusted after each test sequence and then the adjustment remains in effect for the reception of useful data until the next test sequence, since it can be assumed that the determined transfer characteristics of the transmission channel remain constant for a certain period of time.

Modifications and advantageous features of the method according to the invention are defined in the claims, the further description of the invention and the drawing figures which depict one embodiment thereof.

DETAILED DESCRIPTION OF THE PREFERRED EMBODIMENT

Figure 1:
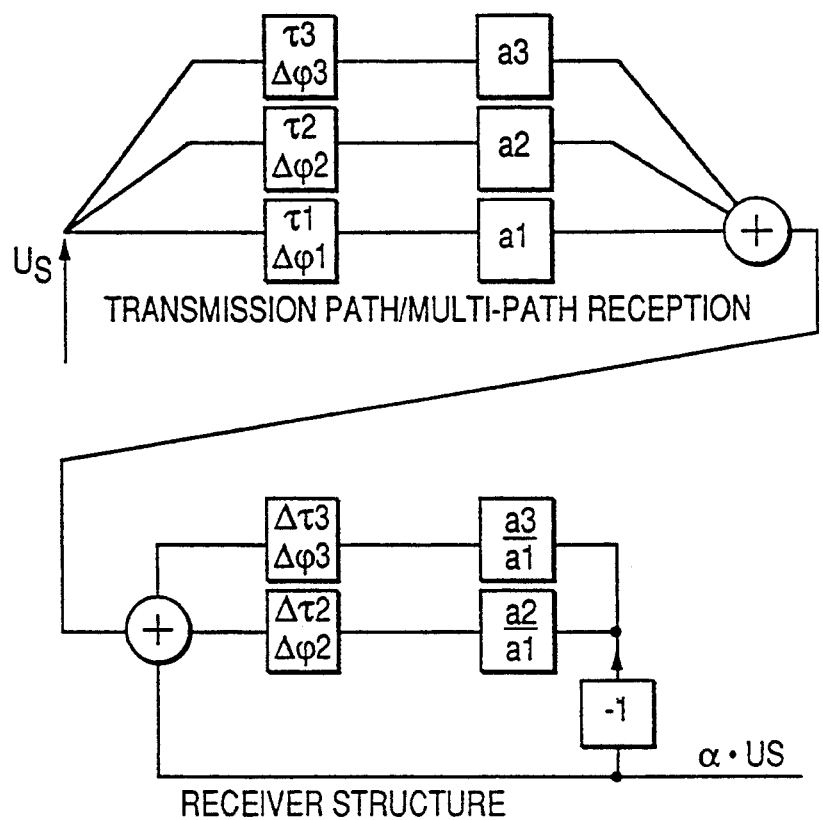
FIG. 1 is a multi-path transmission model with equalization at the receiving end.

In FIG. 1, the transmitted signal $U_S$ travels over a transmission channel which itself includes three transmission paths. These transmission paths differ from one another in their amplitude "a", their delay "$\tau$" and their phase angle "$\phi$". The indices represent the ordinals of the transmission channels. At the receiving end, these three transmission paths are linearly superposed on one another. In the receiver, the distortions are removed in that two feedback connection are provided which carry the inverse transfer functions of two of the three transmission paths. By feeding the received multi-path signal with the inverse sign into these inverse transmission paths so that it is added to itself, a signal $U_S$ results which now reaches the receiver over the path marked with the index 1.

Figure 2:
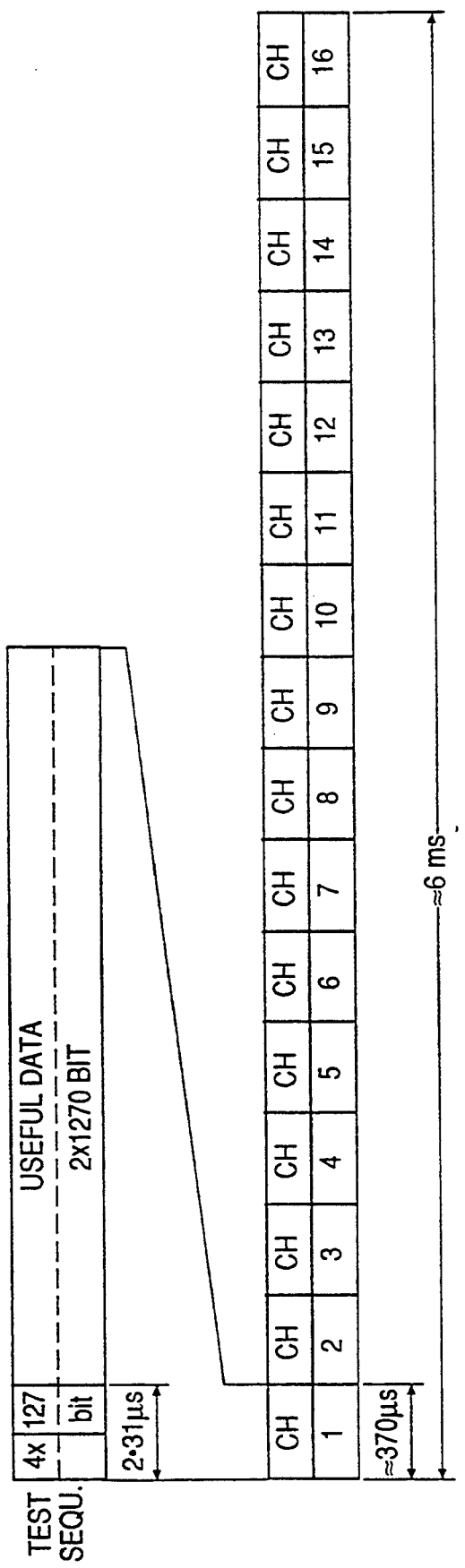
FIG. 2 is the configuration of a data frame in which useful data and test sequences are transmitted.

In order to determine the transfer characteristics of the channel, test sequences are transmitted before the actual transmission of useful data. A frame structure for this data format is shown in FIG. 2. The lower portion of the drawing shows a main frame which, for example, includes 16 data channels Ch1 to CH16. The first data channel CH1 is shown again separately in the upper portion of the drawing expanded in time. As can be seen in the enlarged view, a test sequence is initially transmitted which is then followed by the useful data. Preferably, two successive "M-sequences" are suitable as a test sequence since they have excellent autocorrelation and cross-correlation characteristics.

M-sequences are binary sequences of a maximum length $2^n - 1$ that can be reached with a polynomial of the ordinal n. Such polynomials of the expression $h(x) = h_n \cdot x^n + \ldots + h_1 \cdot x + h_0$ can be realized by means of feedback connected shift registers. In this case, $h_n$ and $h_0$ may equal 1 and the other $h_i$ may equal 0 or 1. The degree n of the polynomial also indicates the number of registers in the shift register. The register outputs represented by $h_i = 1$ must be linked jointly with output $h_0$ by means of EXOR gates and must be connected with input $H_n$. Before running the shift register, the registers must be set; in no case must all registers be set to zero.

If the expression $u_i=(u_0, u_1, \ldots u_{N-1})$ represents an M-sequence, then $T^i u$ is the sequence u cyclically delayed by i clock pulses:

$$T^i u = (u_i, u_{i+1}, \ldots, u_{n-1}, u_0, \ldots u_{i-1})$$

Generally, M-sequences have the following characteristics:
a. the period of u is $N = 2^n - 1$;
b. there are n different phases of sequence u:

$$u, Tu, T^2 u, \ldots T^{N-1}u.$$

c. The EXOR linkage results in the following:

$$T^i u \oplus T^j u = T^k u \text{ for } i \neq j \neq k \; 0 \leq i,j,k < N$$

d. u[q] is formed from M-sequence u in that every $q^{th}$ bit of u is utilized for a new sequence v ($v_i = u_{q \cdot i} \mod N$)·u[q] has a period duration of $N/\gcd(N,q)$, that is, u[q] produces an M-sequence only if q is odd and $\gcd(N,q) = 1$ ($\gcd(N,q)$ represents the greatest common denominator of N and q);
For example, $n = 6$, $N = 63$, $q = 3 \rightarrow \gcd(63,3) = 3$, period $= 63/3 = 21$ u[3] is no M-sequence; u[5] with $N/\gcd(N,q) = 63$ leads to an M-sequence;
e. the reciprocal polynomial of an M-sequence also produces an M-sequence;

$$h'(x) = x^n \cdot h(x^{-1}) = h_0 x^n + \ldots h_{n-1} \cdot x + h_n$$

$u = h(x)$ becomes $u[q]h'(x)$ if $q = 2^{n-1} - 1 = (N-1)/2$;
f. the autocorrelation spectrum of M-sequences has only two values:
$Q_u(l) = N$ for $l = 0 \mod N$ $Q_u(l) = -1$ for $l \neq 0 \mod N$ if $-1/1$ is employed as the pair of binary values.

In order to keep the correlation spectrum free of components that were created by additional superposition of useful data, two M-sequences are transmitted as test sequences. These two M-sequences are identical. The length of the M-sequences is selected so that the maximum difference in delay to be expected on the individual transmission paths is no longer than that of an individual M-sequence. The superposed signal then has a section in the data stream in which only those signal components are present which were created from the superposition of M-sequences and thus contain no additional useful data. This point in time occurs when the second one of the transmitted M-sequences just arrives over the transmission path having the shortest delay, that is, arrives first in the receiver.

Figure 3:
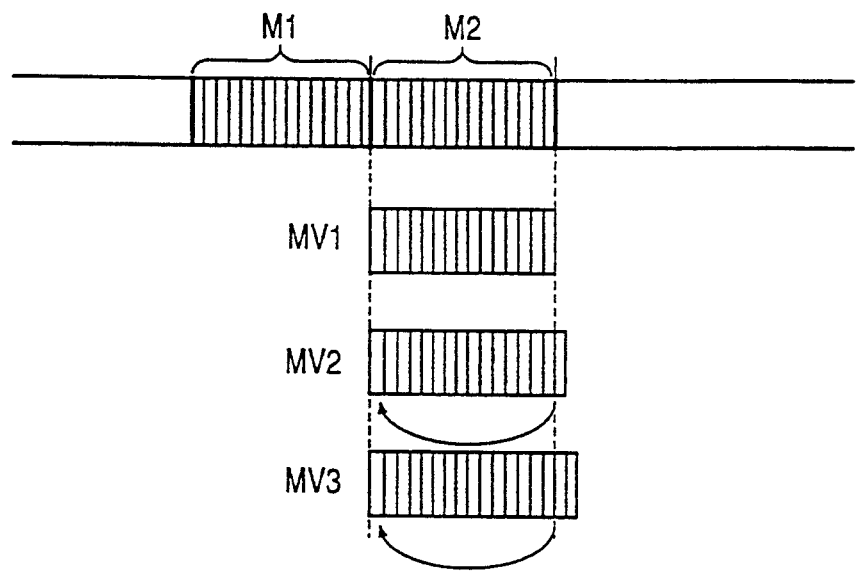
FIG. 3 is a section of a data stream to illustrate the cyclic correlation.

FIG. 3 shows this section which is marked M2. The given M-sequence MVI shown therebelow is intended to indicate that this marked section M2 of the data stream is cyclically correlated with the predetermined M-sequence. The cyclic correlation is effected in several steps which will be explained below. First, each byte of section M2 is multiplied by the bit or byte therebelow of M-sequence MV1. The term byte is mentioned in connection with this section because the additions and subtractions of the signal components resulting from the superposition are displayed with their accurate values. The products resulting in this first step are added together and the result of the addition yields the first individual component of the correlation spectrum.

Then section M2 is shifted by one byte relative to M-sequence MV1 or also vice versa. However, this causes the byte shifted beyond the section to be toppled as shown by the M-sequence MV2 shown therebelow and to be again multiplied by the first byte of the other data word in section M2 so that again all bytes of section M2 and of M-sequence MV2 are included in the multiplication. Addition of the products yields the second individual component of the correlation spectrum. These steps are repeated by way of the also shown third step employing the shifted M-sequence MV3 until all individual components have been determined.

Figure 4:
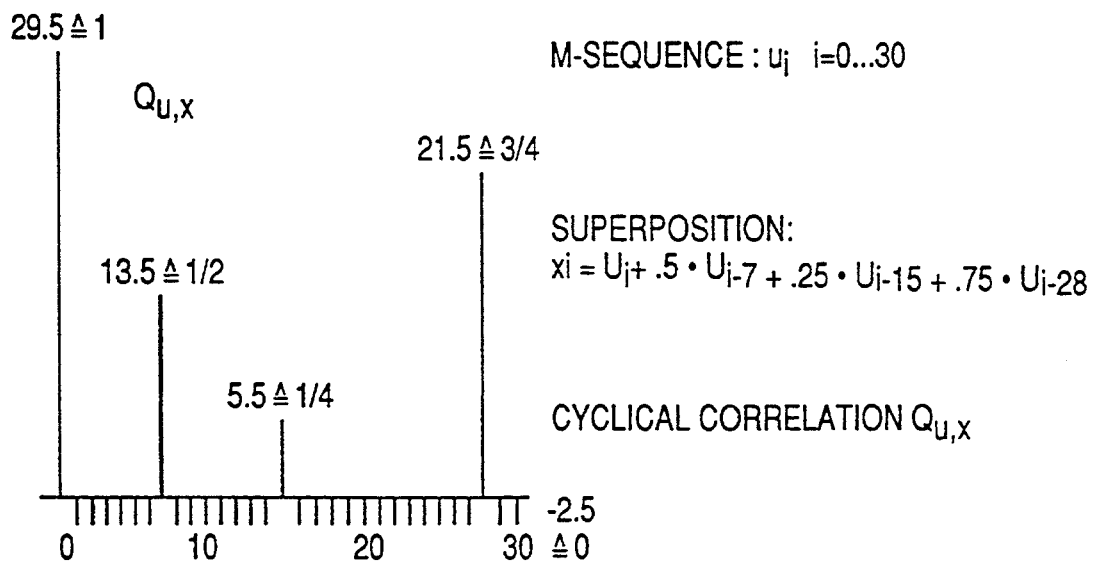
FIG. 4 is a cyclic correlation spectrum.

The mathematical functions describing the M-sequence, the multi-path signal, the correlation and the pulse responses are summarized once more below. A distinction is here made for the pulse responses as to whether the value pair of the M-sequence is $-1/+1$ or $0/+1$:

A possible correlation spectrum resulting for a superposition signal including an M-sequence is shown in FIG. 4. The value pairs employed in the M-sequence are here $-1$ and $1$.

In practice, it is a problem to identify the above-mentioned section M2 in the data stream for the cyclic correlation. Although it would be possible to perform a cyclic correlation permanently, the computations required would be unjustifiably expensive. In principle this is possible because a criterion for the moment of correlation with section M2 could be a correlation spectrum in which distinct individual components are present while in other variations in which correlation calculations are also made with useful data, no distinct individual components become evident.

In order to permit the identification of the section with the least amount of computations, a correlation method is performed which as a whole involves significantly fewer multiplication steps. Here, the superposed data stream formed of M-sequences and useful data is continuously correlated with the stored M-sequences, in each case over the length of one M-sequence, in that part of the data stream of the length of an M-sequence is multiplied byte by byte by the stored M-sequences and the multiplication results are added. Then a part is selected from the data stream which is shifted over by one byte and the multiplication and addition steps are performed for this part and the parts following it. In contrast to the above-described cyclic correlation, this process could be called a serial correlation.

Figure 5A:
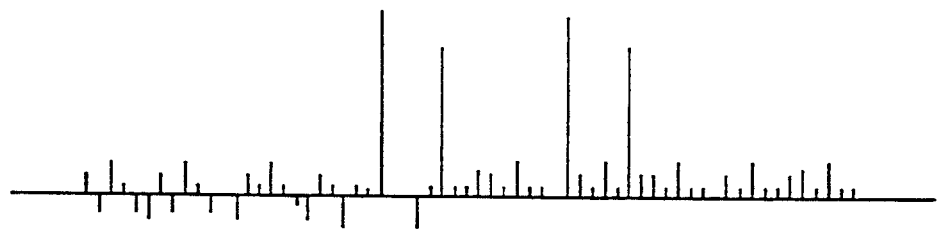
FIG. 5A-5B sow the sum sequences and a sum sequence function derived therefrom.

One possible correlation spectrum which results if a signal reaches the receiver over two paths is shown in FIG. 5a. The four distinct individual components are created in that the correlation furnishes such a pulse response whenever there is time coincidence of the M-sequences included in the data stream with the M-sequence stored in the receiver. Since the M-sequences are transmitted twice in succession and reach the receiver on two paths, four individual components appear.

Figure 5B:
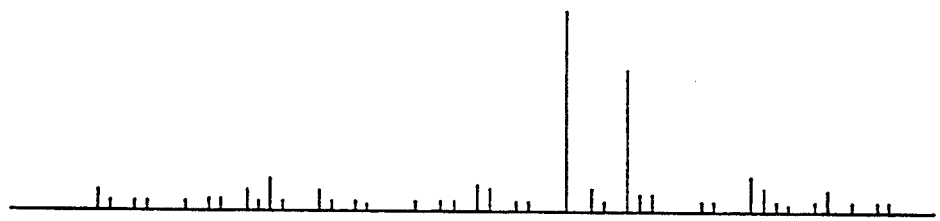

The resulting correlation values are now multiplied by the correlation values obtained previously in the same manner and delayed by one M-sequence. The products having a negative sign are not considered and drop out. The product spectrum is shown in FIG. 5b where two individual components occur now. The resulting products are then added together over the length of an M-sequence.

Figure 5C:
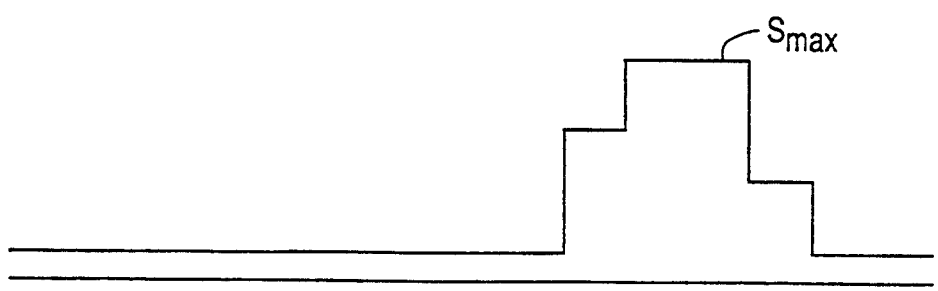

The result of this addition leads to a step-like continuous sum function as shown in FIG. 5c. This sum function reaches its maximum when pure M-sequences are correlated with one another. This characteristic can be utilized for the identification of section M2. Viewed from the descending edge following the maximum value $S_{max}$, the exact beginning of this section M2 lies the length of one M-sequence ahead of this edge.

Once this section M2 has been found in the data stream, the actual cyclic correlation can be performed in the manner described in connection with FIG. 3 in order to determine the channel pulse response.

In multi-stage transmission methods, e.g. 4-PSK transmission, phase shifts on the transmission path may bring about the case that the M-sequences transmitted in the one channel no longer appear in that channel but in the other channel. This is the case in a 4-PSK transmission if a phase shift by 90° occurs. With other phase positions, parts of the M-sequences of the superposed data stream appear in the one channel as well as in the other channel. If one were to transmit separate M-sequences for each channel, interferences may affect the evaluation It is therefore advisable to transmit the M-sequences at the transmitting end only over one channel but to evaluate both channels at the receiving end.

Figure 6:
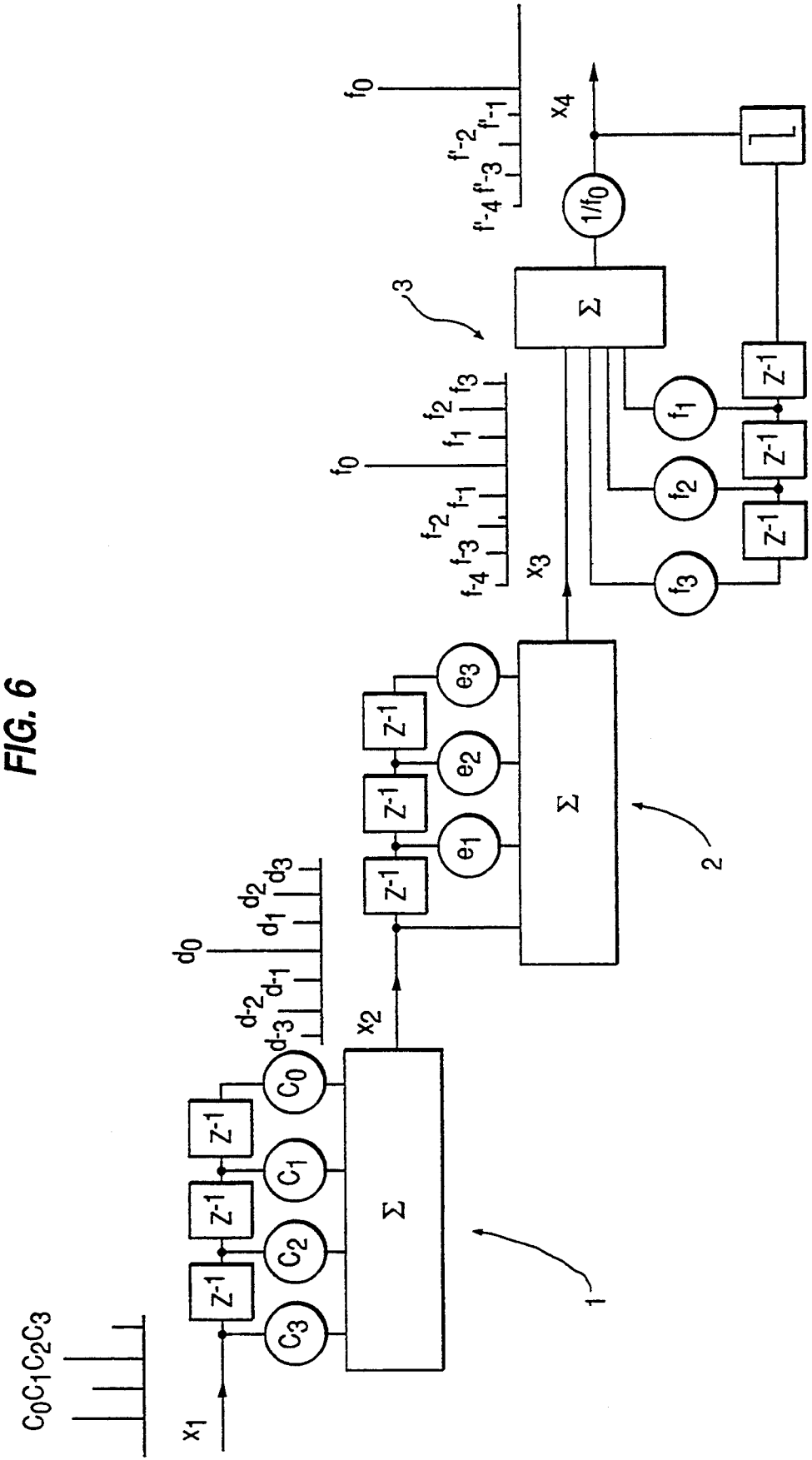
FIG. 6 is a possible filter arrangement for the inverse simulation of the transfer function of the transmission channel.

FIG. 6 shows a filter arrangement that can be controlled by means of the components determined in the correlation spectrum in such a manner that an approximately inverse simulation of the transfer characteristics of the transmission channel is realized. This simulation is initially composed of a matched filter 1 of the illustrated structure It is assumed that the pulse response $x_1$ of the not yet equalized transmission channel has the structure indicated at the input of matched filter 1. The filter characteristic is set by means of coefficients $C_0$, $C_1$ and $C_2$ which correspond to the individual components found in the correlation spectrum. After summing up the individual paths, a spectrum $x_2$ results which includes, for example for three different transmission paths, a distinct main component and ahead of it and behind it, smaller ancillary components.

Spectrum $x_2$ is now conducted through an equalizer 2 whose coefficients result from the obtained modified spectrum $x_2$ at the output of the matched filter The spectrum $x_3$ present at the output of the equalizer is then filtered in such a way that the components disposed ahead of the main component appear to be even more attenuated while, however, the components disposed behind it remain substantially unchanged.

Equalizer 2 is now followed by a feedback equalizer 3 whose structure is also shown. The coefficients of the feedback equalizer are again the result of the components of spectrum $x_3$ at the output of equalizer 2. At the output of feedback equalizer 3, a spectrum $x_4$ appears which contains practically only the main component while the partial components following it are practically erased and only the partial components ahead of it are barely recognizable. However, the value of this main component compared to the adjacent components is so high that an unequivocal distinction can now be made and the transmitted useful data can be evaluated reliably.

We claim:

1. A filter arrangement equalization method, for use in a transmission system having a receiver for receiving digitally coded signals transmitted over a transmission channel, the receiver including the filter arrangement, for compensating for interference due to multi-path reception, the method comprising:
   transmitting to the receiver, before transmission of useful data, predetermined test sequences;
   correlating received test sequences in the receiver with a test sequence identical to the predetermined test sequences transmitted that is stored in the receiver; and
   using a channel pulse response obtained as a result of the correlating step in the form of a correlation spectrum to control filter coefficients of the filter arrangement in the receiver to simulate an inverse transfer function of the transmission channel and thereby compensate for multi-path interference;
   wherein the transmitting step includes transmitting two identical M-sequences in immediate succession as test sequences;
   wherein the correlating step comprises performing a cyclic correlation of a stored M-sequence with a section of a received data stream composed of useful data and M-sequences and which, after multi-path reception, includes superpositions that are offset in time, the section being predetermined by the respective second M-sequence arriving first in the receiver; and
   wherein the stored M-sequence is multiplied byte by byte by the section of the data stream, the multiplication results are added and, after shifting the section by one byte relative to the stored M-sequence, the multiplication and addition steps are repeated until each byte of the section has been multiplied once by each byte of the stored M-sequence and obtained addition results yields a sum of series of the same length as the M-sequence, the sum series being the correlation spectrum.

2. A method according to claim 1, for use in multi-stage transmission methods such as 4-PSK transmission, wherein the test sequences are transmitted in only one channel, while only identical values are transmitted in another channel during the same time span, both channels being subjected to correlation.

3. A method according to claim 1, wherein, in order to determine the section, the data stream composed of M-sequences and useful data is continuously correlated with the stored M-sequence, in each case over the length of one M-sequence;
   wherein part of the data stream of the length of one M-sequence is multiplied byte by byte by the stored M-sequence, multiplication results are added, a part is shifted by one byte and is selected out of the data stream, and the multiplication and addition steps are performed for this selected part and subsequent parts;
   wherein correlation values are multiplied by correlation values that are delayed by one M-sequence;
   wherein the resulting products are added together over the length of one M-sequence; and
   wherein, from a thus produced continuous sum function, a maximum value is evaluated, and a section of the data stream, having a length equal to the length of an M-sequence and lying ahead of a descending edge following the maximum value of the sum function, is selected as the section for cyclic correlation.

4. A method according to claim 1, wherein the period of duration of the test sequences is greater than a greater difference in delay due to a non-direct path of the transmission channel.

5. A method according to claim 2, wherein sum functions are formed by a combined evaluation of the correlation values from both channels that coincide in time.

* * * * *